United States Patent
Yamada et al.

[11] Patent Number: 5,952,810
[45] Date of Patent: Sep. 14, 1999

[54] MOTOR CONTROL APPARATUS AND METHOD OF CONTROLLING MOTOR

[75] Inventors: Eiji Yamada, Owariasahi; Yasutomo Kawabata, Aichi-ken, both of Japan

[73] Assignee: Toyota Jidosha Kabushiki Kaisha, Toyota, Japan

[21] Appl. No.: 09/157,619

[22] Filed: Sep. 21, 1998

[30] Foreign Application Priority Data

Sep. 26, 1997 [JP] Japan ...................................... 9-279695

[51] Int. Cl.⁶ ..................................................... H02P 1/46
[52] U.S. Cl. ............................................................. 318/700
[58] Field of Search ...................................... 318/700–724

[56] References Cited

U.S. PATENT DOCUMENTS 5,608,300   3/1997   Kawabata et al. .

*Primary Examiner*—William M. Shoop, Jr.
*Assistant Examiner*—Rina I. Duda
*Attorney, Agent, or Firm*—Oblon, Spivak, McClelland, Maier & Neustadt, P.C.

[57] ABSTRACT

The object of the present invention is to provide a technique that detects an electrical angle of a synchronous motor with a high accuracy and adequately controls the synchronous motor even when the synchronous motor is driven under a non-loading condition. The direction that passes through a rotating shaft of the motor and causes a magnetic flux to pass through permanent magnets is defined as a d-axis. Even when the motor is driven under the non-loading condition and no flow of electric currents through windings is required in response to a torque requirement, the method of the present invention applies a voltage to the d-axis, based on an estimated electrical angle. Application of the voltage is realized by switching on and off a transistor inverter with a delay of a dead time. The method solves voltage equations with the applied voltages and the electric currents corresponding to the voltages, and controls the motor while correcting the electrical angle with errors of the arithmetic operations. A dead-time correction is carried out prior to the solution of the voltage equations, based on the direction of the flow of the electric current through the d-axis. This eliminates the effects of the dead time on the switching operations.

4 Claims, 9 Drawing Sheets

MOTOR CONTROL APPARATUS AND METHOD OF CONTROLLING MOTOR

BACKGROUND OF THE INVENTION

1. Field of the Invention

The present invention relates to a technique of controlling operation of a synchronous motor in a sensor-less manner, or more specifically to a technique of controlling operation of a synchronous motor that is driven under a non-loading condition.

2. Description of the Related Art

In a synchronous motor that rotates a rotor through an interaction between a magnetic field occurring when multi-phase alternating currents are flown through windings and a magnetic field produced by permanent magnets, in order to obtain a desired rotational torque, it is required to control the multi-phase alternating currents according to the electrical angle or the electrical position of the rotor. The electrical angle may be detected with a sensor, such as a Hall element. It is, however, desirable to detect the electrical angle and control operation of the synchronous motor in a sensor-less manner, with the view to assuring the reliability of a control apparatus of the synchronous motor.

In the case where the motor is rotated under a non-loading condition, it is not required to make the electric currents flow through the windings.

This case requires neither detection of the electrical angle nor control of the motor. It is accordingly sufficient that switching elements of a driving circuit for making the electric current flow through the windings are all set in the OFF position. Control of the motor resumes when the motor is driven again under a loading condition. This method, however, does not assure accurate detection of the electrical angle on the re-start of the control, which may result in inadequate control of the motor and cause a torque variation. In order to realize a smooth shift of the driving state of the motor from the non-loading condition to the loading condition, it is desirable to detect the electrical angle even in the course of operation of the motor under the non-loading condition.

A proposed method detects the electrical angle according to voltage equations (1) and (2) given below in a sensor-less manner in a salient pole-type synchronous motor especially when the motor is driven at a relatively high speed (hereinafter simply referred to as the high-speed operation):

$$Vd = R \cdot Id + p(Ld \cdot Id) - \omega \cdot Lq \cdot Iq \qquad (1)$$

$$Vq = R \cdot Iq + p(Lq \cdot Iq) - \omega \cdot Ld \cdot Id + \omega \phi \qquad (2)$$

where V denotes voltages applied to the motor, I electric currents flowing through the windings of the motor, and L inductances of the windings. The subscripts d and q attached to V, I, and L show that the values relate to the d-axis direction and the q-axis direction of the motor. R denotes the coil resistance of the motor, $\omega$ the rotational angular velocity of the motor, and $\phi$ the number of flux linkages. Among these arithmetic elements, the coil resistance of the motor R, the inductances L, and the number of flux linkages $\phi$ are intrinsic to the motor and are thereby referred to as the motor constants. The time derivative operator p is defined as:

$$p(Ld \cdot Id) = d(Ld \cdot Id)/dt$$

Figure 4:
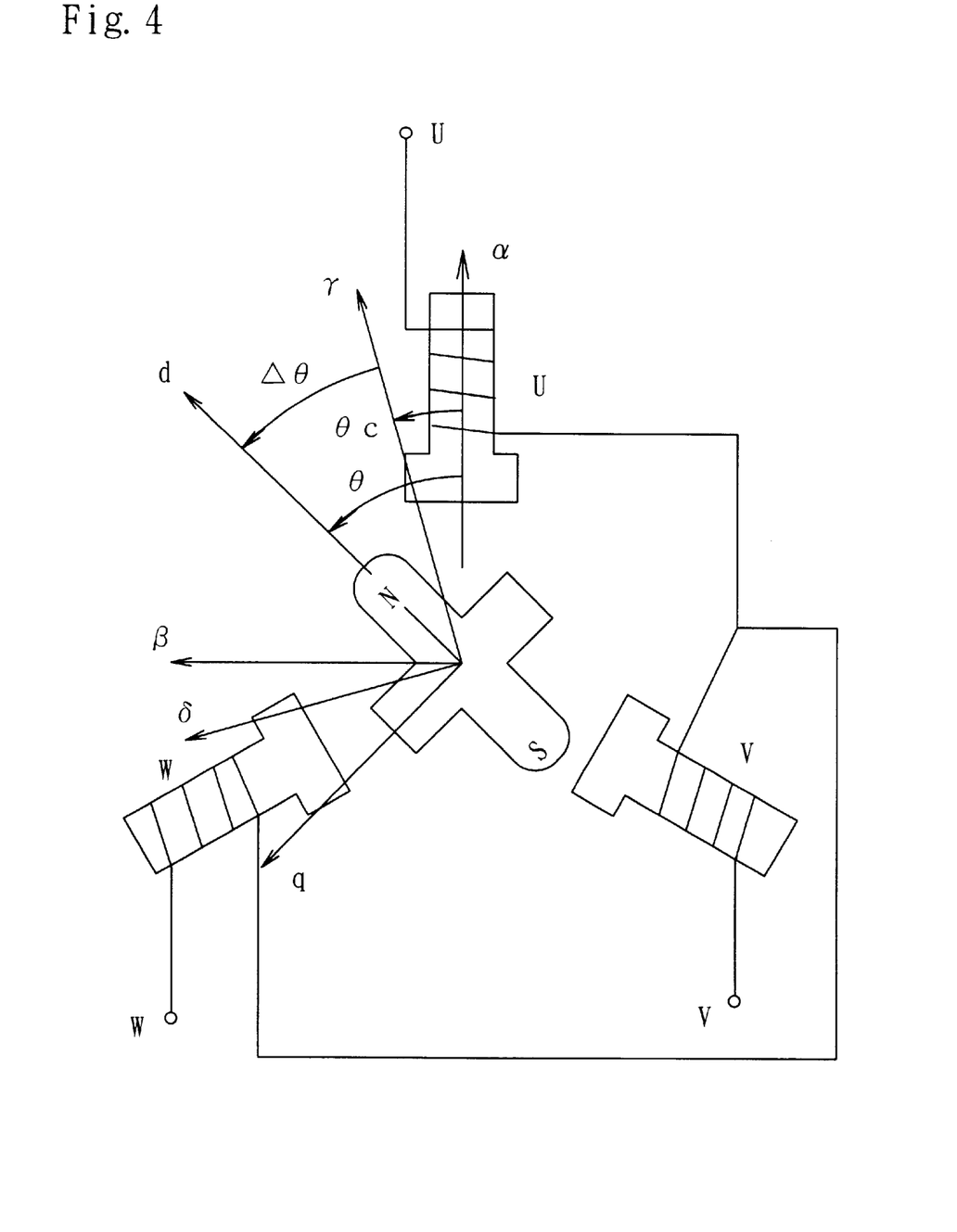
FIG. 4 is an equivalent circuit diagram of the three-phase synchronous motor 40.

The d-axis and the q-axis are described briefly with the drawing of FIG. 4. A permanent magnets-type three-phase synchronous motor is expressed by an equivalent circuit shown in FIG. 4. In this equivalent circuit, the direction that passes through a center of rotation of the motor and is along a magnetic field produced by a permanent magnet is generally referred to as the d-axis. The direction that is perpendicular to the d-axis in a plane of rotation of the rotor is generally referred to as the q-axis. In the equivalent circuit of FIG. 4, the angle of the U phase and the d-axis corresponds to an electrical angle $\theta$ of the motor.

The proposed method of electrical angle detection using the voltage equations (1) and (2) is briefly described. The voltage equations (1) and (2) are always valid with respect to the d-axis and the q-axis, but the accurate value of the electrical angle is unknown in the case of the sensor-less control of the motor. The motor control apparatus accordingly solves the voltage equations (1) and (2) with an estimated electrical angle (corresponding to $\theta c$ in FIG. 4). Errors of the arithmetic operations accordingly exist corresponding to an angular error ($\Delta\theta$ in FIG. 4) between the estimated electrical angle $\theta c$ and the true electrical angle $\theta$. Successive correction of the estimated electrical angle $\theta c$ with the errors of the arithmetic operations gives the accurate electrical angle.

The proposed method of electrical angle detection detects the electrical angle in the sensor-less manner with a high accuracy in the case where the permanent magnets-type motor is driven at a relatively high speed. In the synchronous motor in this driving state, however, when the required torque of the motor is substantially equal to zero, that is, when the motor is driven under the non-loading condition, this method has the significantly lowered accuracy of detection of the electrical angle or can not even detect the electrical angle at all.

Figure 8:
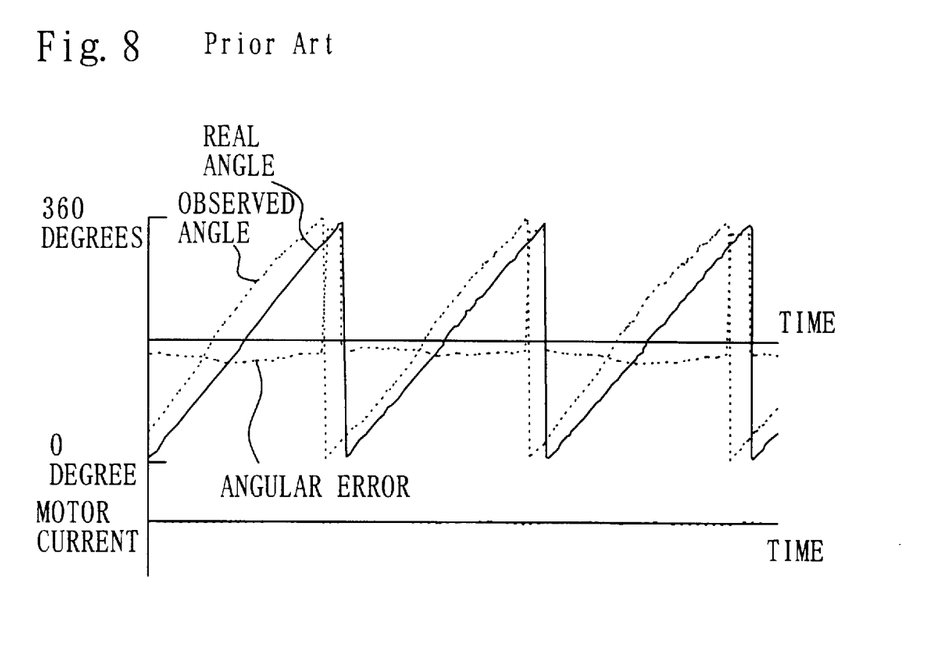
FIG. 8 is a graph showing the results of the electrical angle detection by the conventional method.

FIG. 8 shows the results of electrical angle detection when the motor is driven under the non-loading condition. The graph of FIG. 8 shows a comparison between a real electrical angle of the rotating motor actually measured with a sensor and an observed electrical angle detected in a sensor-less manner. As clearly understood from the graph of FIG. 8, the observed angle includes a significant error relative to the real angle.

SUMMARY OF THE INVENTION

The object of the present invention is thus to provide a technique that detects an electrical angle of a synchronous motor with a high accuracy and adequately controls the synchronous motor even when the synchronous motor is driven under a non-loading condition.

In order to realize the above and the other related objects, the present invention applies a predetermined voltage, which enables a significant electric current to flow through windings in a synchronous motor irrespective of magnitude of a voltage applied corresponding to a torque command value, when the torque command value required for the synchronous motor is substantially equal to zero. The synchronous motor, to which the present invention is applied, rotates a rotor through an interaction between a magnetic field occurring when multi-phase alternating currents are flown through the windings and a magnetic field produced by permanent magnets. The multi-phase alternating current are generated by switching on and off a plurality of switching elements that are arranged in pairs for a plurality of phases and connected to a source and a drain of a power source. The control procedure of the present invention switches on and off the plurality of switching elements with a delay of a dead time, so as to apply a voltage to the windings based on an estimated electrical angle and a torque command value. The electrical angle is successively corrected according to a predetermined arithmetic operation, which uses voltages corrected to eliminate an effect of the dead time, electric currents flowing through the windings in response to the applied voltages, and inductances specified according to characteristics of the synchronous motor.

The structure of the present invention enables accurate detection of the electrical angle of the motor and adequate control of the motor even when the motor is driven under the non-loading condition as described below.

It is first required to elucidate the cause of unsuccessful detection of the electrical angle by the conventional method when the motor is driven under the non-loading condition. There have been no reports on the phenomenon and the cause that the electrical angle can not be detected when the motor is driven under the non-loading condition. The inventors of the present invention have elucidated the cause as discussed below, based on a variety of experiments and analyses.

As described previously, the conventional method of electrical angle detection solves the voltage equations (1) and (2) with an estimated electrical angle (corresponding to $\theta c$ in FIG. 4) and corrects the estimated electrical angle $\theta c$ with the errors of the arithmetic operations, so as to determine the real electrical angle. The errors of the arithmetic operations are obtained by replacing the time derivative (d/dt) with the time difference (variation/time) and rewriting the voltage equations (1) and (2) as Equations (3) through (5) given below:

$$\Delta Id = Id(n) - Id(n-1) - t(Vd - RId + \omega LqIq)/Ld \quad (3)$$

$$\Delta Iq = Iq(n) - (q(n-1) - t(Vq - RIq - \omega LdId - E(n-1))/Lq \quad (4)$$

$$E(n) = E(n-1) - K1\Delta Iq \quad (5)$$

The variables Id and Iq denote the electric currents flowing through the d-axis and the q-axis. The subscript (n) and (n−1) are attached to the variables, based on the fact that the arithmetic operations are periodically repeated. The subscript (n) shows that the values are obtained in the current cycle of the arithmetic operations, and the subscript (n−1) shows that the values are obtained in the previous cycle of the arithmetic operations. The expression Id(n)−Id(n−1) accordingly represents the variation in electric current Id from the previous cycle to the current cycle of the arithmetic operations. The value t denotes the cycle at which the arithmetic operations are carried out.

The variables Vd and Vq denote the voltages applied to the windings, $\omega$ the rotational angular velocity of the motor, and Ld and Lq the inductances in the d-axis direction and the q-axis direction. The rotational angular velocity $\omega$ is expressed in the unit of rad/sec, and a relation of $\omega=2\pi \cdot N/60$ is valid between the rotational angular velocity $\omega$ and the revolving speed N (rpm) of the motor. The constant K1 is experimentally specified and denotes the gain that correlates E(n), E(n−1), and $\Delta Iq$ and is used for calculation of the electrical angle.

The estimated electrical angle $\theta(n-1)$ (corresponding to $\theta c$ in FIG. 4), which is based on the result of the previous cycle of the electrical angle detection, is corrected with $\Delta Id$, $\Delta Iq$, and E(n) thus calculated to obtain the new electrical angle $\theta(n)$ according to Equation (6) given below:

$$\theta(n) = \theta(n-1) + tE(n)/K2 + sgn \cdot K3 \cdot \Delta Id \quad (6)$$

where the operator 'sgn' denotes '+' in the case of $\omega>0$ and '−' in the case of $\omega<0$. Like the constant K1, the constants K2 and K3 are experimentally specified and denote the gains used for calculation of the electrical angle. The control process is on the assumption that the motor is in the state of high-speed operation. It is thus not required to take into account the case where the motor is at a stop, that is, in the case of $\omega=0$.

It is here assumed that the motor is driven under the non-loading condition. In this case, since no electric currents flow through the windings, $Id=Iq\approx 0$ in Equations (3) through (6) given above. As clearly understood from the voltage equations (1) and (2) described above, a counter electromotive force exists while the motor is rotated, even when the electric current is equal to zero. Namely the values Vd and Vq are not equal to zero, and Equations (3) through (6) are rewritten as Equations (7) through (10) given below:

$$\Delta Id = t \cdot Vd/Ld \quad (7)$$

$$\Delta Iq = t \cdot (Vq - E(n-1))/Lq \quad (8)$$

$$E(n) = E(n-1) - K1\Delta Iq \quad (9)$$

$$\theta(n) = \theta(n-1) + tE(n)/K2 \quad (10)$$

In Equations (7) through (10) given above, it is difficult to directly measure the voltages Vd and Vq applied to the d-axis and the q-axis. Voltage command values that are to be applied to the motor windings are generally used for the values Vd and Vq. The switching elements that constitute a driving circuit for applying voltages to the windings are generally switched on and off with a delay of a dead time, for the purpose of preventing a short circuit. By way of example, a control signal is input into the switching elements, which are arranged in pairs to be connected to the source and the drain of the power source, in order to change the state of the switching elements from the drain side-ON and the source side-OFF condition to the drain side-OFF and the source side-ON condition. The switching elements connected to the drain and the source are all turned OFF simultaneously with the input of the control signal. After an elapse of a predetermined time period, which is generally referred to as the dead time, the switching elements connected to the source are turned ON. Namely the desired on-off conditions are attained only after the dead time has elapsed since the input of the control signal. This causes the time period of the actual voltage application to be deviated from the time period of voltage application specified by the control signal. Such a deviation is called a dead-time loss.

The dead-time loss always arises in the driving circuit that carries out the switching operations with a delay of the dead time. In general, a dead-time correction is performed to eliminate the effect of the dead time. The dead-time loss, however, does not always appear in the direction that shortens the time period of voltage application. The time period of voltage application may be shortened or extended according to the direction of the flow of the electric current through the switching elements. In accordance with a general procedure, the appropriate dead-time correction is performed after the direction of the effect of the dead-time loss is specified based on the direction of the flow of the electric current.

In the case where the motor is driven under the non-loading condition, a magnetic field for generating a torque is not required, and no electric currents flow through the windings. The dead-time correction can thus not be adequately performed in this case. This causes Equations (7) and (8) given above to include errors due to the dead-time loss and prevents the error of the electrical angle from converging with Equations (9) and (10). Based on the variety of experiments and analyses, the inventors of the present invention have elucidated that the fundamental cause of the unsuccessful detection of the electrical angle while the motor is driven under the non-loading condition is related to the dead-time correction.

By taking into account the fundamental cause described above, the motor control apparatus and the motor control method of the present invention apply a predetermined voltage, which enables a significant electric current to flow through the windings, even when the torque command value of the motor is substantially equal to zero, that is, when the motor is driven under the non-loading condition. In the case where the motor is driven under the non-loading condition, it is not necessary to make the electric current flow through the windings in response to the torque command value. The structure of the invention, however, makes the significant electric current flow through the windings. This flow of the electric current determines whether the effect of the dead-time loss appears in the direction that shortens the time period of voltage application or in the direction that extends the time period of voltage application. This structure thus ensures the adequate dead-time correction. The flow of the electric current through the windings and the adequate dead-time correction enable the electrical angle to be detected with a high accuracy according to Equations (3) through (6) given above, and thereby ensure adequate control of the motor. It is not required to add any special hardware structure to the motor control apparatus that controls the motor in a normal driving state other than the non-loading condition. This easily realizes the arrangement of the present invention.

The object of the present invention is to enable the driving state of the motor to shift smoothly from the non-loading condition to the loading condition. The detection of the electrical angle according to the above procedure may be carried out only immediately before the generation of the torque in the case where some time delay between the input of the torque command value into the motor and the actual generation of the torque is allowed and in the case where the timing of generating the torque is known in advance. This arrangement effectively reduces the time period, for which the significant electric current is made to flow through the windings, for the purpose of detection of the electrical angle.

The significant electric current implies that the magnitude of the electric current is sufficient for specifying the direction of the flow of the electric current, and is experimentally specified according to the motor. When the motor is driven under the non-loading condition, the motor races and does not perform any work. The specification hereof, however, considers that keeping the driving state based on the electrical angle is included in the motor control operation.

A variety of methods may be applied for the dead-time correction carried out in the motor control apparatus. One applicable method corrects the control signal input into the switching elements, in order to make the actually applied voltages under the effect of the dead-time loss coincident with the voltages to be applied. Another applicable method corrects voltage command values output from the motor control apparatus to the values corresponding to the actually applied voltages and substitutes the corrected values into Equations (3) through (6) given above.

In accordance with one preferable application of the present invention, the voltage applied under the condition of the torque command value substantially equal to zero generates a magnetic field having a direction that passes through the center of rotation of the rotor and is along the magnetic field produced by the permanent magnets.

The direction that passes through the center of rotation of the rotor and is along the magnetic field produced by the permanent magnets is the d-axis direction (see FIG. 4). As is generally known, the magnetic field in the q-axis direction is a main dominant factor of the torque in the synchronous motor, whereas the magnetic field in the d-axis direction has no significant effect on the torque. The procedure of making the electric current flow in the d-axis direction to detect the electrical angle and control the motor hardly causes a torque variation due to the flow of the electric current through the windings.

These and other objects, features, aspects, and advantages of the present invention will become more apparent from the following detailed description of the preferred embodiment with the accompanying drawings.

DESCRIPTION OF THE PREFERRED EMBODIMENT (1) Structure of Embodiment

Figure 1:
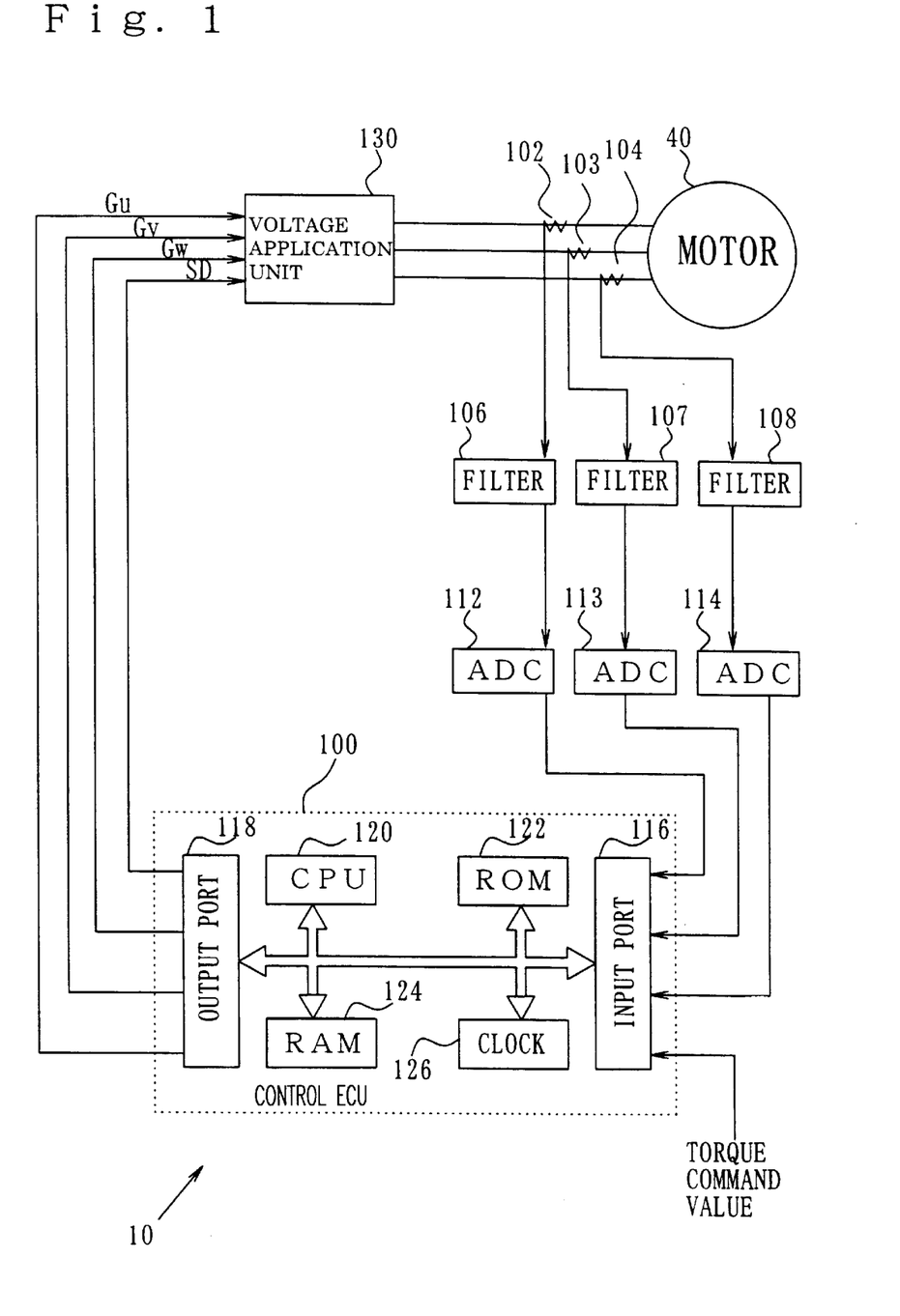
FIG. 1 is a block diagram schematically illustrating the structure of a motor control apparatus 10 as a first embodiment according to the present invention.
Figure 2:
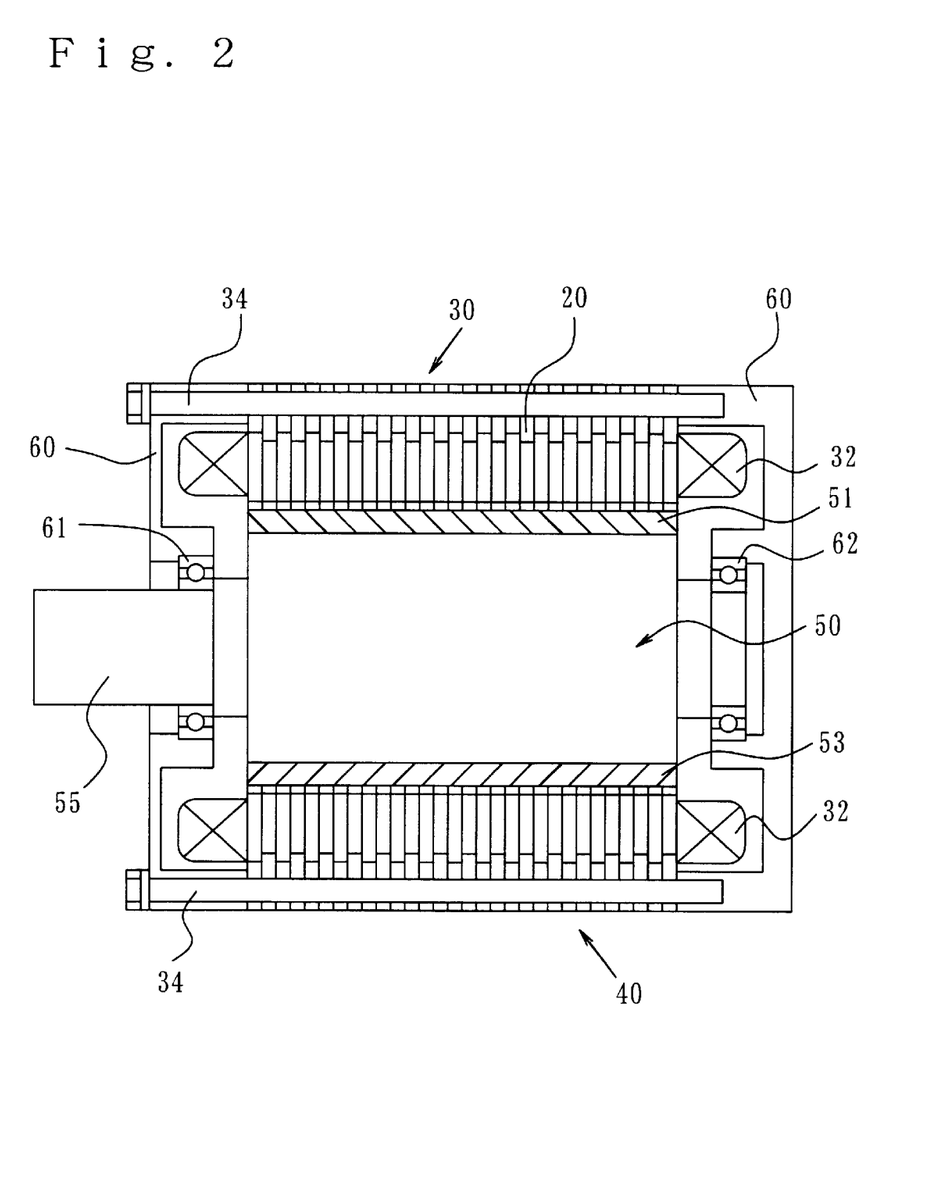
FIG. 2 schematically illustrates the structure of a three-phase synchronous motor 40.
Figure 3:
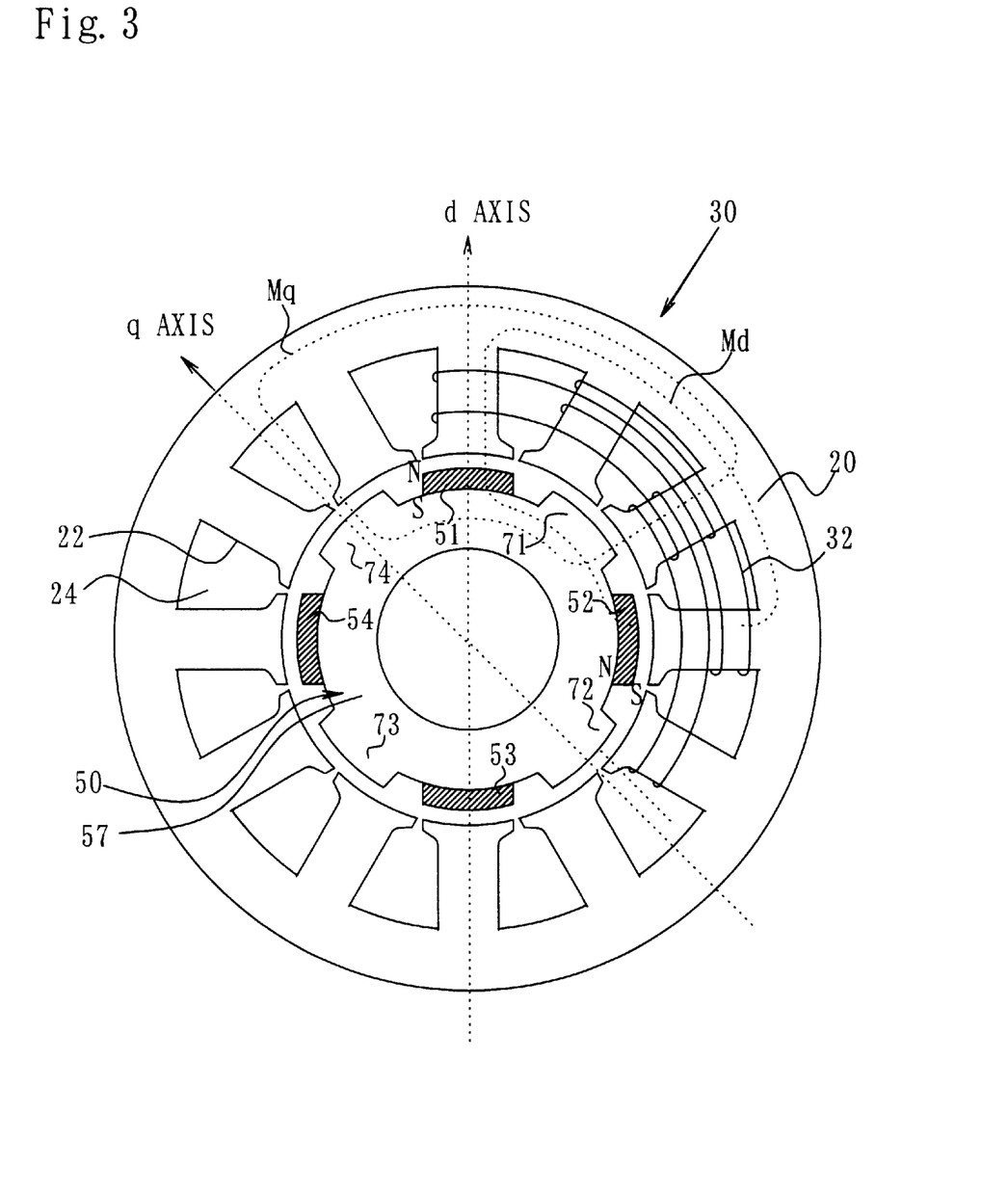
FIG. 3 is an end view showing the positional relationship between a stator 30 and a rotor 50 in the three-phase synchronous motor 40.

One mode of carrying out the present invention is discussed below as a preferred embodiment. FIG. 1 is a block diagram schematically illustrating the structure of a motor control apparatus 10 including an electrical angle detection apparatus as one embodiment according to the present invention. FIG. 2 schematically illustrates the structure of a three-phase synchronous motor 40, which is the object to be controlled. FIG. 3 is an end view showing the positional relationship between a stator 30 and a rotor 50 in the three-phase synchronous motor 40.

Referring to FIG. 2, the three-phase synchronous motor 40 includes the stator 30, the rotor 50, and a casing 60 for accommodating the stator 30 and the rotor 50 therein. The rotor 50 has permanent magnets 51 through 54 attached to the outer circumference thereof and is provided with a rotating shaft 55. The rotating shaft 55 passes through the axial center of the rotor 50 and is rotatably supported by bearings 61 and 62 disposed in the casing 60.

The rotor 50 is prepared by laying a plurality of plate-like rotor elements 57, which are punched out of a non-directional electromagnetic steel plate, one upon another. Each rotor element 57 has four salient poles 71 through 74 arranged in a cross configuration as shown in FIG. 3. The rotating shaft 55 is pressed into the laminate of the rotor elements 57, so as to temporarily fix the laminate of the rotor elements 57. Each rotor element 57 composed of the electromagnetic steel plate has an insulating layer and an adhesive layer formed on the surface thereof. The laminate of the rotor elements 57 is heated to a predetermined temperature, which fuses the adhesive layers and thereby fixes the laminate of the rotor elements 57.

After the assembly of the rotor 50, the permanent magnets 51 through 54 are attached to the outer circumferential surface of the rotor 50 along the axis of the rotor 50 at the positions between the salient poles 71 through 74. The permanent magnets 51 through 54 are magnetized in the radial direction of the rotor 50 in such a manner that the adjoining magnets form magnetic poles of different polarities. For example, the outer circumferential face of the permanent magnet 51 forms an N pole, whereas the outer circumferential face of the adjoining permanent magnet 51 forms an S pole. In the state that the rotor 50 is combined with the stator 30, the pair of the permanent magnets 51 and 52 form a magnetic path Md that passes through the rotor elements 57 and stator elements 20 (described below) as shown by the one-dot chain line in FIG. 3.

The stator 30 is prepared by laying a plurality of plate-like stator elements 20, which are punched out of a non-directional electromagnetic steel plate like the rotor elements 57, one upon another. Each stator element 20 has twelve teeth 22 as shown in FIG. 3. Coils 32 for causing the stator 30 to generate a revolving magnetic field are wound on slots 24 formed between the teeth 22. Bolt holes, each of which receives a fixation bolt 34, are formed in the outer circumference of the stator element 20, although being omitted from the illustration of FIG. 3.

The stator 30 is temporarily fixed by heating the laminate of the stator elements 20 under pressure and fusing the adhesive layers thereof. In this state, the coils 32 are wound on the teeth 22 to complete the stator 30. The stator 30 is then placed in the casing 60 and fixed to the casing 60 by fitting the fixation bolts 34 in the bolt holes. The rotor 50 is then rotatably attached to the casing 60 by means of the bearings 61 and 62. This completes the assembly of the three-phase synchronous motor 40.

When an excitation current is flown to generate a revolving magnetic field on the stator coils 32 of the stator 30, a magnetic path Mq is formed to pass through the adjoining salient poles as well as the rotor elements 57 and the stator elements 20 as shown by the two-dot chain line in FIG. 3. The axis 'd' represents the axis through which the magnetic flux formed by the permanent magnet 52 passes in the radial direction of the rotor 50, whereas the axis 'q' represents the axis through which the magnetic flux formed by the stator coils 32 of the stator 30 passes in the radial direction of the rotor 50. The d-axis and the q-axis are axes of rotation with rotation of the rotor 50. In this embodiment, the outer circumferential faces of the permanent magnets 51 and 53 attached to the rotor 50 form N poles, whereas the outer circumferential faces of the permanent magnets 52 and 54 form S poles. The geometrical angle of the d-axis and the q-axis is accordingly 45 degrees as shown in FIG. 3. FIG. 4 shows an equivalent circuit of the three-phase synchronous motor 40 of this embodiment. The three-phase synchronous motor 40 is expressed by an equivalent circuit including three-phase coils of U, V, and W phases and a permanent magnet rotating about an axis of rotation. In the equivalent circuit, the d-axis is defined as the axis that passes through the N pole of the permanent magnet as the positive direction. The electrical angle is given as a rotational angle θ of the axis that passes through the U-phase coil and the d-axis.

Referring to FIG. 1, the motor control apparatus 10 includes a control ECU 100 that regulates the motor currents supplied to the three phases, U, V, and W phases of the three-phase synchronous motor 40 in response to an external torque instruction, electric current sensors 102, 103, and 104 that respectively measure a U-phase current Au, a V-phase current Av, and a W-phase current Aw of the three-phase synchronous motor 40, filters 106, 107, and 108 that eliminate high-frequency noises from the observed electric currents, and three analog-digital converters (ADC) 112, 113, and 114 that convert the observed electric currents to digital data.

The control ECU 100 includes a microprocessor (CPU) 120 that carries out arithmetic and logic operations, a ROM 122 in which the processing of the CPU 120 and required data are stored in advance, a RAM 124, which data required for the processing are temporarily written in and read from, and a clock 126 that counts the time. These elements are mutually connected via a bus. An input port 116 and an output port 118 are also connected to the bus. The CPU 120 reads the observed electric currents Au, Av, and Aw flowing through the respective phases, U, V, and W phases, of the three-phase synchronous motor 40 via these ports 116 and 118.

Figure 5:
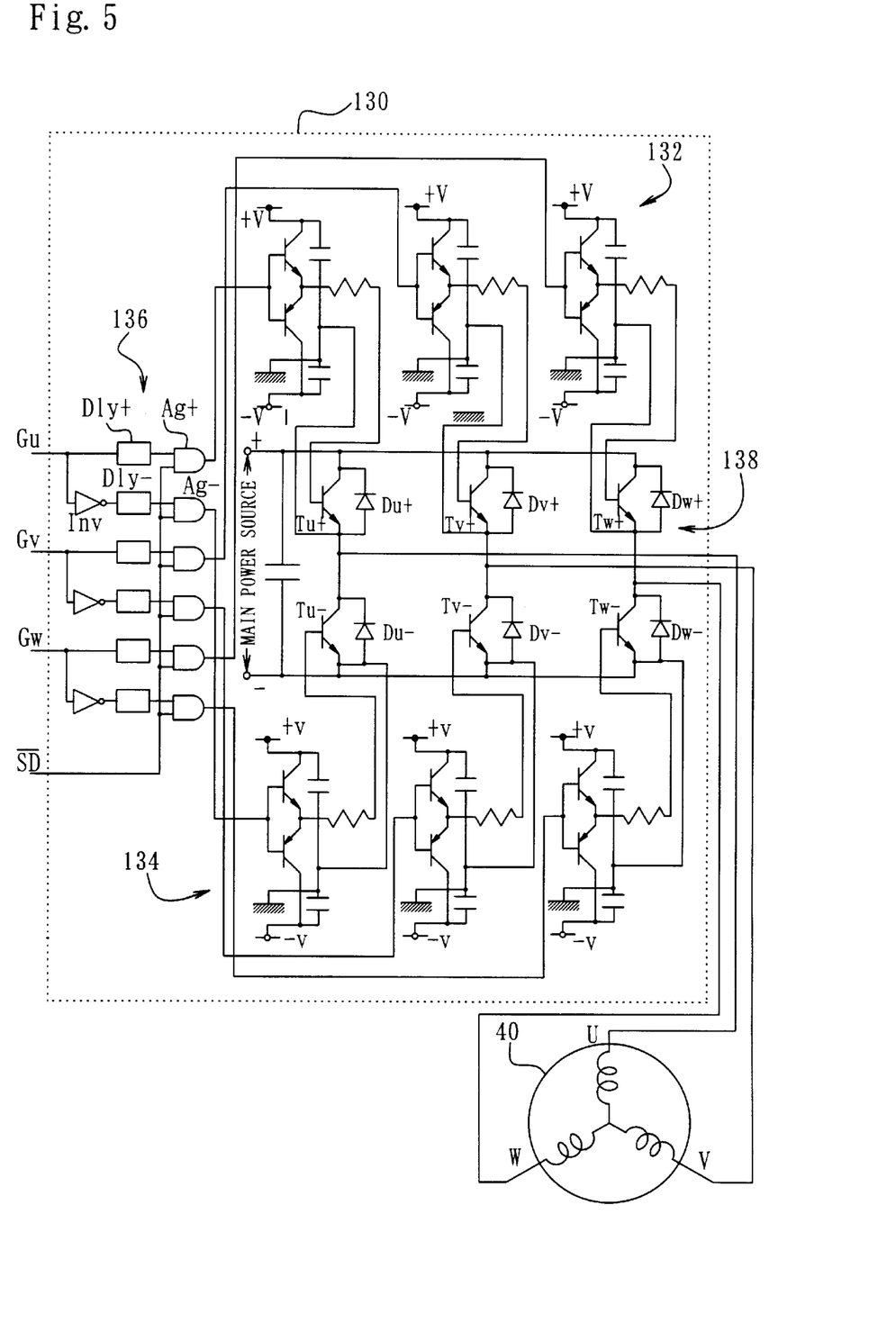
FIG. 5 is a circuit diagram illustrating the structure of a voltage application unit 130.

The control ECU 100 has a voltage application unit 130 arranged on its output side. The voltage application unit 130 applies voltages between the respective coils of the three-phase synchronous motor 40, so as to obtain the phase currents Au, Av, and Aw of the three-phase synchronous motor 40 determined corresponding to an independently input torque command value. The CPU 120 gives control outputs Gu, Gv, Gw, and SD to the voltage application unit 130, in order to externally regulate the voltages applied to the respective coils of the three-phase synchronous motor 40. FIG. 5 shows the detailed structure of the voltage application unit 130.

The voltage application unit 130 includes a transistor inverter 138, a source pre-drive circuit 132, a drain pre-drive circuit 134, and an interface element 136. The transistor inverter 138 includes six transistors Tu+, Tu−, Tv+, Tv−, Tw+, and Tw−, which are arranged in pairs for the U, V, and W phases to be connected to the source and the drain of a main power source. The transistors are respectively provided with flywheel diodes Du+, Du−, Dv+, Dv−, Dw+, and Dw−. The source pre-drive circuit 132 inputs gate signals into the source transistors Tu+, Tv+, and Tw+ of the transistor inverter 138. The source pre-drive circuit 132 includes six transistors, which are arranged in pairs for the U, V, and W phases to be connected to the source +V and the drain −V of a transistor inverter driving power source. The drain pre-drive circuit 134 has a similar structure. The interface element 136, which divides and transmits the control signals Gu, Gv, and Gw from the control ECU 100, is connected to the source pre-drive circuit 132 and the drain pre-drive circuit 134.

The structure of the interface element 136 is described in the example of the U phase. A signal line from the control ECU 100 is connected to the source pre-drive circuit 132 via a delay circuit Dly+ and an AND gate Ag+. The signal line branches off before the delay circuit Dly+ and also connected to the drain pre-drive circuit 134 via an inverter Inv, a delay circuit Dly− and an AND gate Ag−. The delay circuits Dly+ and Dly− output signals without any time delay in response to a change from the high level to the low level of the input voltage, while outputting signals with a predetermined time delay (hereinafter referred to as the dead time) in response to a change from the low level to the high level of the input voltage.

A signal line for transmitting a low-active shutdown signal SD, which instantaneously turns off all the outputs, is also connected to the other inputs of the AND gates Ag+ and Ag−. The shutdown signal SD is also transmitted to the other inputs of the AND gates for the V and W phases. When the shutdown signal SD is at the low level, the outputs of these AND gates are all at the low level, so that all the gate signals of the transistor inverter 138 are at the low level. No voltage is accordingly applied to the synchronous motor 40. The shutdown signal SD is generally kept at the high level, and the outputs of the respective AND gates thus depend upon the signals Gu, Gv, and Gw output from the control ECU 100 to the voltage application unit 130. The following description is on the assumption that the shutdown signal SD is at the high level.

The interface element 136 has the function discussed below. When the control ECU 100 changes the signal Gu of the U phase from the low level to the high level, the delay circuit Dly+ outputs the signal to the AND gate Ag+ of the source pre-drive circuit 132 with a delay of the dead time. This causes the high-level signal to be output to the source pre-drive circuit 132 with the delay of the dead time. Namely the source transistor Tu+ of the transistor inverter 138 is turned ON when the dead time has elapsed since the input of the signal to the U phase. The signal is inverted by the inverter Inv and transmitted to the drain pre-drive circuit 134. This means that the delay circuit Dly− receives the signal changed from the high level to the low level. The delay circuit has the characteristics described above, and thereby outputs the signal to the AND gate Ag− without any time delay. The low-level signal is thus output to the drain pre-drive circuit 134 almost simultaneously with the signal input from the control ECU 100, so as to turn OFF the drain transistor Tu− of the transistor inverter 138.

When the signal Gu of the U phase is changed from the high level to the low level, on the contrary, the source transistor Tu+ of the transistor inverter 138 is turned OFF almost simultaneously with the signal input. The drain transistor Tu− is then turned ON with a delay of the dead time. The interface element 136 takes advantage of the dead time and prevents the source transistor Tu+ and the drain transistor Tu− of the transistor inverter 138 from being turned ON at the same time. This is also applicable for the V and W phases.

(2) Motor Currents Control Process

The motor control apparatus 10 of the embodiment controls the electric currents as described below with the drawing of FIG. 4. The flow of the electric current Au through the U phase causes a magnetic field, which passes through the U phase and has the strength that varies with the magnitude of the electric current Au. The U-phase current Au is accordingly expressed as a vector having the direction of the magnetic field and the magnitude Au. In a similar manner, the V-phase current Av and the W-phase current Aw flowing through the V phase and the W phase are expressed as vectors. An arbitrary electric current vector in the plane is given as the sum of electric current vectors in representative two directions. The representative two directions are, for example, a direction $\alpha$ and a direction $\beta$ shown in FIG. 4. The electric current vector corresponding to a magnetic field occurring in an arbitrary direction in the plane of rotation of the motor is expressed by electric currents A$\alpha$ and A$\beta$ flowing through the two-phase coils. In accordance with a concrete procedure, the electric currents A$\alpha$ and A$\beta$ that are equivalent to certain electric currents Au, Av, and Aw are expressed by Equations (11) given below:

$$A\alpha = Au - Av/2 - Aw/2$$

$$A\beta = \sqrt{3}/2 \cdot (Aw - Av) \tag{11}$$

In the case where A$\alpha$ and A$\beta$ are known, on the contrary, the respective phase currents Au, Av, and Aw are determined by Equations (12) given below, based on the condition that the total of the electric currents of the U, V, and W phases is equal to zero (Au+Av+Aw=0).

$$Au = 2(\sqrt{3} - 3) \cdot A\alpha/3$$

$$Av = (3 - \sqrt{3}) \cdot (A\alpha - A\beta)/3$$

$$Aw = (3 - \sqrt{3}) \cdot (A\alpha + A\beta)/3 \tag{12}$$

This is the generally known three phase-to-two phase conversion. The following describes the procedure of controlling the electric currents in the three-phase synchronous motor 40 with the electric currents A$\alpha$ and A$\beta$ after the three phase-to-two phase conversion.

The electric current vectors may be defined with respect to the magnetic fields occurring in the d-axis direction and the q-axis direction of FIG. 4. Magnitudes Ad and Aq of the electric current vectors in the d-axis direction and the q-axis direction are expressed with the electric currents A$\alpha$ and A$\beta$ in the direction $\alpha$ and the direction $\beta$ as Equations (13) given below:

$$Ad = A\alpha \cdot \cos\theta + A\beta \cdot \sin\theta$$

$$Aq = -A\alpha \cdot \sin\theta + A\beta \cdot \cos\theta \tag{13}$$

In the case where Ad and Aq are known, in the contrary, A$\alpha$ and A$\beta$ are determined by Equations (14) given below:

$$A\alpha = Ad \cdot \cos\theta - Aq \cdot \sin\theta$$

$$A\beta = Ad \cdot \sin\theta + Aq \cdot \cos\theta \tag{14}$$

Specification of the electric currents flowing in the d-axis direction and the q-axis direction in the three-phase synchronous motor 40 determines the two-phase electric currents $\alpha$ and A$\beta$ according to Equations (14) and the electric currents to be actually flown through the U, V, and W phases according to Equations (12). This also determines the voltages to be applied to the U, V, and W phases. The control of the electric currents in the three-phase synchronous motor 40 is based on this idea. Another possible arrangement directly specifies the relationship between the electric currents in the d-axis direction and the q-axis direction and the U, V, and W phase currents, without using the electric current vectors in the directions $\alpha$ and $\beta$. In the following description, for example, the 'd-axis electric current and the q-axis electric current' imply the magnitude of the electric current vectors based on the idea discussed above. When the electric current flowing through the synchronous motor is divided into the d-axis direction and the q-axis direction, the q-axis electric current is a main dominant factor of the torque of the synchronous motor 40 as is generally known.

Figure 6:
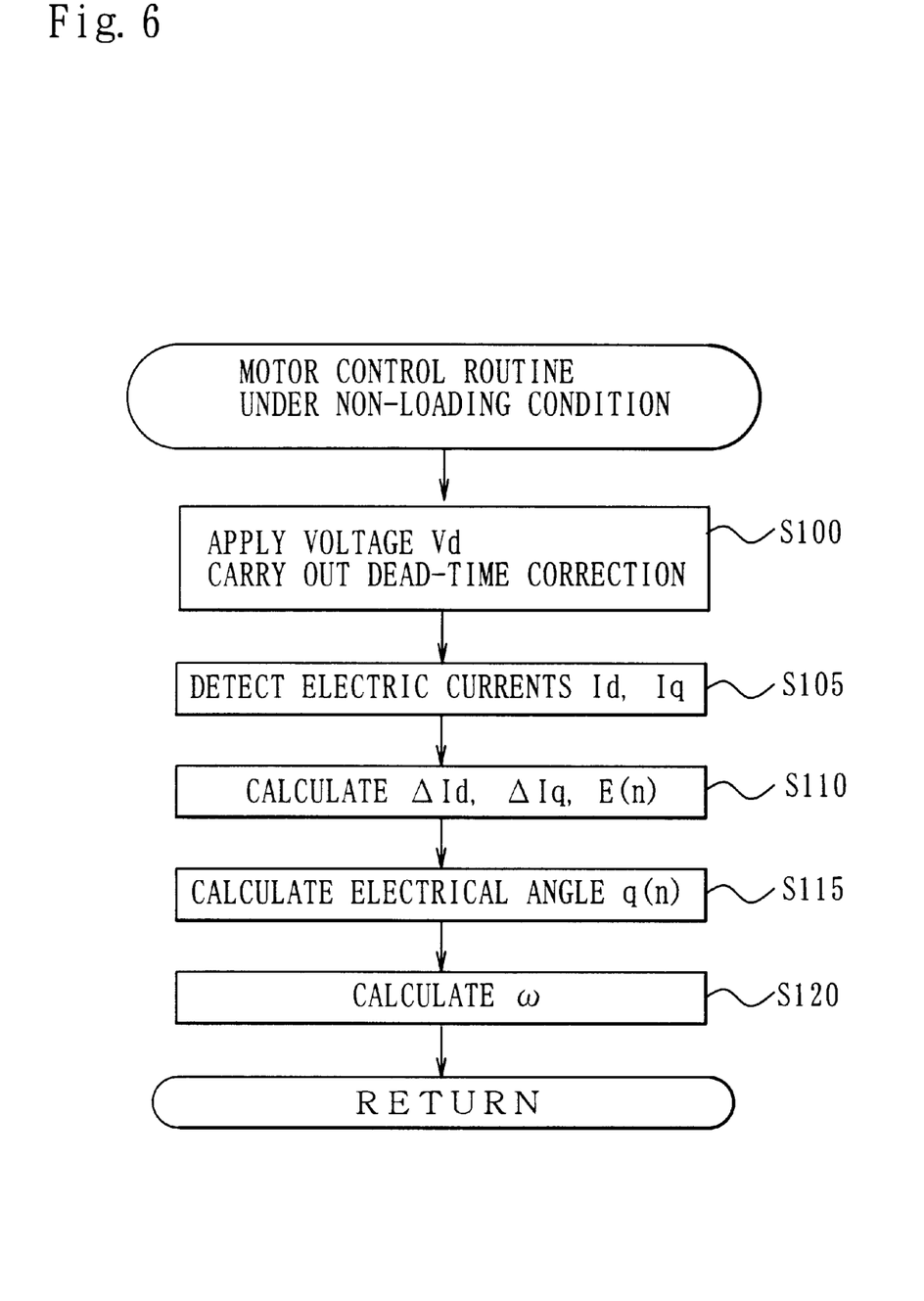
FIG. 6 is a flowchart showing a motor control routine under a non-loading condition.

(3) Motor Control under Non-Loading Condition FIG. 6 is a flowchart showing a motor control routine under a non-loading condition, which is carried out to control the motor having a torque command value substantially equal to zero, that is, the motor being driven under a non-loading condition. The CPU 120 of the control ECU 100 shown in FIG. 1 periodically executes this routine with other control routines. It is not necessary that the torque command value is identical with zero, but this routine is carried out in a predetermined range of the torque command value that is around zero. It is desirable to set a hysteresis for the determination of execution or non-execution of this routine based on the torque command value, in order to prevent chattering in the case where the torque command value is close to zero.

When the program enters the motor control routine under the non-loading condition, the CPU 120 first applies a voltage to the d-axis and carries out dead-time correction at step S100. At this moment, the CPU 120 does not detect the accurate electrical angle and thereby applies a voltage to the d-axis that is defined based on an estimated electrical angle (θc in FIG. 4). The d-axis defined in this manner corresponds to the γ axis in FIG. 4. The applied voltage has a magnitude that allows the electric current for specifying the direction to flow through the windings as described later. This embodiment applies a voltage that allows the flow of the electric current corresponding to several percents of the rated electric current of the motor 40.

The dead-time correction may be carried out before or after application of the voltage to the d-axis. The following describes the effect of the dead time with the timing chart of FIG. 7 and a concrete procedure of the dead-time correction. For the simplicity of explanation, the following description is on the assumption that the electrical angle is zero degree, that is, the d-axis coincides with the U phase, and that the motor is at a stop.

Figure 7:
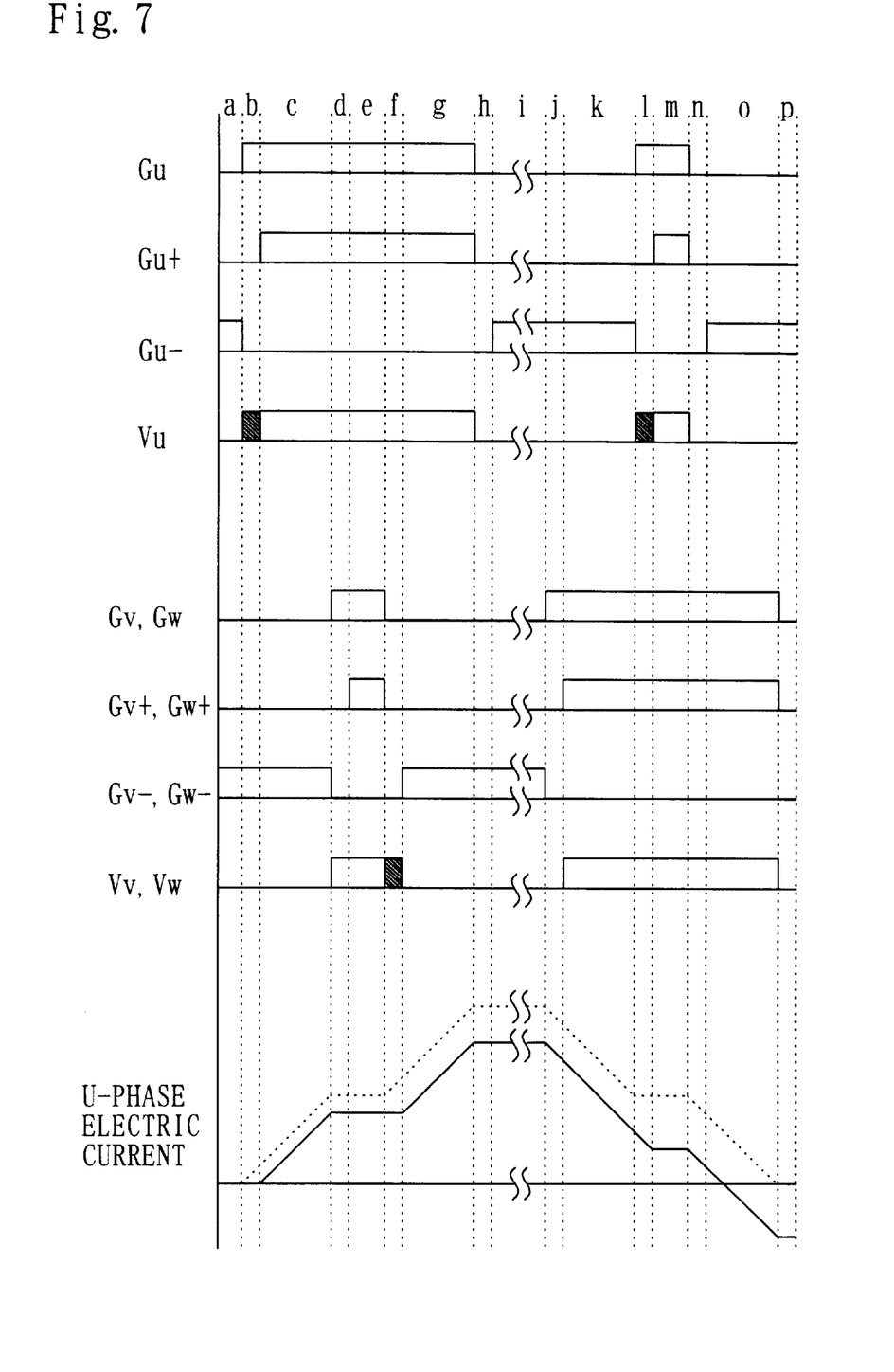
FIG. 7 is a timing chart showing the effects of a dead time when a voltage is applied to the U phase.

FIG. 7 is a timing chart showing the gate signals of the respective transistors and the electric current flowing through the U phase in response to application of the voltage to the U phase, which are plotted against the time axis. The symbols a through p in FIG. 7 denote areas divided according to the switching conditions of the respective transistors. For convenience of explanation, FIG. 7 regards the case in which the CPU 120 first applies a positive voltage (hereinafter referred to as the voltage in the normal direction) to the U phase (the areas b through g), waits for a predetermined time period (the areas h and i), and then applies a negative voltage (hereinafter referred to as the voltage in the reverse direction) to the U phase (the areas j through o). In the actual state, the d-axis rotates with rotation of the motor and varies the state of voltage application in the U, V, and W phases. Although the example of FIG. 7 applies a voltage pulse to regulate the mean voltage applied to the U phase (for example, the areas d and e), the voltage pulse may alternatively be not output.

The symbols Gu, Gv, and Gw in FIG. 7 denote the signals of the U, V, and W phases output from the control ECU 100 to the voltage application unit 130. The symbol Gu+ denotes the output of the AND gate Ag+ of the interface element 136, that is, the gate signal of the source transistor Tu+ for the U phase in the transistor inverter 138, whereas the symbol Gu− denotes the output of the AND gate Ag− of the interface element 136, that is, the gate signal of the drain transistor Tu− for the U phase in the transistor inverter 138. In a similar manner, the symbols Gv+ and Gw+ denote the gate signals of the source transistors Tv+ and Tw+ for the V and W phases, whereas the symbols Gv− and Gw− denote the gate signals of the drain transistors Tv− and Tw− for the V and W phases. The symbols Vu, Vv, and Vw denote potentials of the U, V, and W phases occurring as the results of the switching operation of the respective transistors. The U-phase electric current shows the flow of the electric current through the coil windings of the motor 40, where the direction going from the U phase to the V and W phases is defined as the positive direction. The solid curve shows the electric current with the dead time, and the dotted curve shows the electric current without the dead time and under the ideal switching condition.

When the high-level gate signal Gu is output in the area b to start application of the voltage to the U phase, the drain transistor Tu− for the U phase is instantly turned OFF (Gu− in FIG. 7). The source transistor Tu+ is, on the other hand, not turned ON instantly but turned ON in the area c after an elapse of the dead time (Gu+ in FIG. 7). Namely the U-phase electric current starts flowing in the area c. In the case of no dead time and ideal switching operation, the U-phase electric current starts flowing in the area b as shown by the dotted curve in FIG. 7. The dead time accordingly causes a deficiency of the voltage in the normal direction corresponding to the area b (that is, the hatched portion of the potential Vu in FIG. 7).

When the high-level gate signals Gv and Gw are output in the area d, the drain transistors Tv− and Tw− for the V and W phases are instantly turned OFF (Gv− and Gw− in FIG. 7). This results in no application of the voltage between the U phase and the V-W phase corresponding to the main power source. The induced electromotive force, however, arises in the coil windings and thereby keeps the U-phase electric current. The electric currents flowing into the V and W phases respectively flow via the flywheel diodes Dv+ and Dw+, which are arranged in parallel to the source transistors Tv+ and Tw+. When the dead time has elapsed since the signal output, the gate signals Gv+ and Gw+ of the source transistors Tv+ and Tw+ for the V and W phases rise to the high level in the area e. At this moment, the electric currents still flow via the flywheel diodes Dv+ and Dw+. This state is not changed when the low-level gate signals Gv and Gw are output in the area f and the gate signals Gv+ and Gw+ of the source transistors Tv+ and Tw+ for the V and W phases fall to the low level. When the dead time has elapsed since the signal output in the area g and the drain transistors Tv− and Tw− for the V and W phases are turned ON, the voltage in the normal direction is again applied to the U phase to increase the electric current. In the case of no dead time and ideal switching operation, the electric current starts flowing in the area f as shown by the dotted curve in FIG. 7. The dead time accordingly causes a deficiency of the voltage in the normal direction corresponding to the area f (that is, the hatched portion of the potentials Vv and Vw in FIG. 7).

In response to the output of the low-level gate signal Gu in the area h, the source transistor Tu+ for the U phase is turned OFF and the induced electromotive force keeps the U-phase electric current.

The following describes the case in which the voltage in the reverse direction is applied. When the high-level gate signals Gv and Gw are output in the area j, the drain transistors Tv− and Tw− for the V and W phases are turned OFF instantly as shown in FIG. 7. This causes the electric current flown out of the drain of the main power source via the flywheel diode Du− arranged in parallel to the drain transistor Tu− for the U phase to be flown into the source of the main power source via the flywheel diodes Dv+ and Dw+ arranged in parallel to the source transistors Tv+ and Tw+ for the V and W phases. Even in the state where the source transistors Tv+ and Tw+ for the V and W phases are OFF, the voltage in the reverse direction is applied to the U phase to decrease the electric current. This state is not changed when the source transistors Tv+ and Tw+ for the V and W phases are turned ON in the area k after the dead time has elapsed since the signal output. In the case of no dead time and ideal switching operation, the electric current also starts decreasing at the moment when the high-level gate signals Gv and Gw are output in the area j. There is accordingly no effect of the dead time.

The drain transistor Tu− for the U phase is turned OFF instantly in response to the output of the high-level gate signal Gu in the area l. The U-phase electric current has, however, already flown via the flywheel diode Du– arranged in parallel to the drain transistor Tu– for the U phase as described above. This state is not changed and the electric current continues decreasing even when the drain transistor Tu– is turned OFF. When the source transistor Tu+ for the U phase is turned ON in the area m after the dead time has elapsed since the signal output, there is no potential difference between the U, V, and W phases. The induced electromotive force accordingly keeps the U-phase electric current. In the case of no dead time, the decrease in electric current stops simultaneously with the signal output in the area l. In this case, the dead time causes an increase in voltage in the reverse direction corresponding to the area l (that is, the hatched portion of the potential Vu in FIG. 7).

The output of the low-level gate signal Gu in the area n returns the state to be identical with that in the area l and the U-phase electric current again starts decreasing. In the case of no dead time, the U-phase electric current decreases in the same manner, and there is accordingly no effect of the dead time. The decrease in U-phase electric current does not change even when the gate signal Gu– of the drain transistor Tu– for the U phase rises to the high level in the area o. The U-phase electric current has a negative value in the area o, so that the electric current flows out of the V and W phases to the U phase. The subsequent output of the low-level gate signals Gv and Gw in the area p causes the induced electromotive force to keep the U-phase electric current.

As described above, the effect of the dead time does not necessarily appear in the direction that shortens the time period of voltage application, but may appear in the direction that extends the time period of voltage application. There is also the case in which the dead time has no effect.

The effect of the dead time depends upon the on-off conditions of the transistors as well as the direction of the flow of the electric current. The dead-time correction is carried out at step S100 in the flowchart of FIG. 6, in order to eliminate the effect of the dead time according to the combination of the on-off conditions of the transistors with the direction of the flow of the electric current. There are lots of combinations of the on-off conditions of the transistors with the direction of the flow of the electric current, and are not concretely described here. In principle, while the electric current flows via the flywheel diode (for example, Du+, Du– in FIG. 5), the switching operation of the transistor arranged in parallel to the flywheel diode (for example, Tu+ in parallel to Du+) causes no effect of the dead time. The other switching operations, however, cause some effect of the dead time on the time period of voltage application.

As clearly understood from the above description, it is required to specify the direction of the flow of the electric current for the dead-time correction. The specification may depend upon the outputs of the electric current sensors 102, 103, and 104 shown in FIG. 1. Alternatively the specification may be carried out on the assumption that the electric current flows in the direction in response to the instruction given by the CPU 120, that is, in the d-axis direction in this embodiment. In the case where the outputs of the electric current sensors 102, 103, and 104 are used for the specification, the harmonic accompanied with the switching operation of the voltage application unit 130 may cause chattering. In order to avoid such a chattering, the structure of this embodiment specifies the direction of the flow of the electric current based on the instruction of the CPU 120.

As mentioned above, the dead-time correction may be carried out before or after application of the voltage to the d-axis. The procedure of carrying out the dead-time correction before application of the voltage to the d-axis corrects the gate signals Gu, Gv, and Gw shown in the timing chart of FIG. 7 and applies the corrected voltage to the d-axis. This embodiment adopts this procedure for the dead-time correction.

For example, the gate signal Gu is output to start the flow of the electric current in the area b shown in FIG. 7. The dead-time correction quickens the time point at which the high-level gate signal Gu is output by the time period corresponding to the dead time and causes the output of the high-level gate signal Gu in the area a. The delay of the switching operation by the dead time from the signal output enables the electric current to start flowing in the area b.

The procedure of carrying out the dead-time correction after application of the voltage to the d-axis corrects the voltage command value output from the CPU 120, in order to make the corrected voltage command value equal to the actually applied voltage. The voltage command value output from the CPU 120 is used for calculating the correction of the electrical angle as described later. This procedure of the dead-time correction corrects the voltage command value used for the calculation to be identical with the voltage actually applied.

By way of example, the high-level gate signal Gu of the U phase is output during the time period corresponding to the areas b through g in the timing chart of FIG. 7. The effect of the dead time causes the source transistor Tu+ for the U phase to be actually in the ON state during the time period corresponding to the areas c through g. The dead-time correction corrects the voltage command value output from the CPU 120 to be identical with the value that enables the output of the high-level gate signal Gu of the U phase for the time period corresponding to the areas c through g.

Referring back to the flowchart of FIG. 6, after the dead-time correction, the CPU 120 detects electric currents Id and Iq at step S105. In accordance with a concrete procedure, the CPU 120 receives signals output from the electric current sensors 102, 103, and 104, which measure the electric currents of the U, V, and W phases, via the filters 106, 107, and 108, the ADCs 112, 113, and 114, and the input port 116, and converts the input electric currents of the U, V, and W phases into the electric currents Id and Iq in the d-axis direction and the q-axis direction according to the method described in (2) Motor Currents Control Process. This phase conversion is also based on the estimated electrical angle (θc in FIG. 4).

At subsequent step S110, the CPU 120 calculates ΔId, ΔIq, and E(n) from the observed electric currents Id and Iq according to Equations (15) through (17), which are given below and identical with Equations (3) through (5) described previously:

$$\Delta Id = Id(n) - Id(n-1) - t(Vd - RId + \omega LqIq)/Ld \tag{15}$$

$$\Delta Iq = Iq(n) - (q(n-1) - t(Vq - RIq - \omega LdId - E(n-1))/Lq \tag{16}$$

$$E(n) = E(n-1) - K1\Delta Iq \tag{17}$$

The variables Id and Iq denote the electric currents flowing through the d-axis and the q-axis. The subscript (n) and (n−1) are attached to the variables, based on the fact that the motor control routine under the non-loading condition is periodically repeated. The subscript (n) shows that the values are obtained at step S105 in the current cycle of the motor control routine under the non-loading condition, and the subscript (n−1) shows that the values are obtained in the previous cycle of this routine. The expression Id(n)−Id(n−1) accordingly represents the variation in electric current Id from the previous cycle to the current cycle of the motor control routine under the non-loading condition. The value t denotes the cycle at which the motor control routine under the non-loading condition is carried out. In Equations (15) and (16), it is desirable that the mean values of the previous data Id(n−1) and Iq(n−1) and the current data Id(n) and Iq(n) are set to the variables Id and Iq without any subscript, although the former data or the latter data may be applicable for Id and Iq.

The variables Vd and Vq denote the voltages applied to the windings, ω the rotational angular velocity of the motor, and Ld and Lq the inductances in the d-axis direction and the q-axis direction. The rotational angular velocity ω is expressed in the unit of rad/sec, and a relation of ω=2π·N/60 is valid between the rotational angular velocity ω and the revolving speed N (rpm) of the motor. The constant K1 is experimentally specified and denotes the gain that correlates E(n), E(n−1), and ΔIq and is used for calculation of the electrical angle. The voltage command values output from the CPU 120 are substituted into the voltages Vd and Vq.

The CPU 120 then corrects the estimated electrical angle θ(n−1) (corresponding to θc in FIG. 4), which is based on the result of the previous cycle of the electrical angle detection, with ΔId, ΔIq, and E(n) thus calculated to obtain the new electrical angle θ(n) according to Equation (18) given below at step S115:

$$\theta(n)=\theta(n-1)+tE(n)/K2+sgn\cdot K3\cdot \Delta Id \quad (18)$$

where the operator 'sgn' denotes '+' in the case of ω>0 and '−' in the case of ω<0. Like the constant K1, the constants K2 and K3 are experimentally specified and denote the gains used for calculation of the electrical angle. The control process is on the assumption that the motor is in the state of high-speed operation. It is thus not required to take into account the case where the motor is at a stop, that is, in the case of ω=0.

At subsequent step S120, the CPU 120 calculates the rotational angular velocity ω according to Equation (19) given below:

$$\omega=tE(n)/K2+sgn\cdot K3\cdot \Delta Id \quad (19)$$

The calculated value ω is used for the arithmetic operations of Equations (15) and (16) in the next cycle of the motor control routine under the non-loading condition. Another possible procedure may calculate the value ω either at step S110 or at step S115.

The CPU 120 repeatedly executes the above processing to control the operation of the motor while successively correcting the electrical angle. The motor control routine under the non-loading condition is described as an independent routine that is carried out when the motor is driven under the non-loading condition. This routine may, however, be combined with a motor control routine at high-speed rotation, which is carried out when the motor is driven at a high speed under the loading condition.

The motor control routine at high-speed rotation basically carries out the processing similar to that shown in the flowchart of FIG. 6. The differences are that the motor control routine at high-speed rotation does not apply the voltage Vd to the d-axis (step S100 in the flowchart of FIG. 6) and that electric currents control process is carried out after the calculation of ω (step S120) to control the electric currents flowing through the windings of the motor. The electric currents control process specifies the electric currents corresponding to the torque required for the motor to be flown through the d-axis and the q-axis, converts the specified electric currents into the electric currents of the U, V, and W phases according to the method described in (2) Motor Currents Control Process, and causes the electric currents to flow through the respective phases. The dead-time correction is carried out for the voltages to be applied to the U, V, and W phases.

In the motor control routine under the non-loading condition shown in the flowchart of FIG. 6, the processing of step S100 is executed when the required torque is substantially equal to zero. There is a branch to skip the processing of step S100 otherwise. The electric currents control process is added after the calculation of ω (step S120). There is also a branch to skip the electric currents control process when the required torque is substantially equal to zero. This arrangement enables the motor control routine at high-speed rotation to be merged with the motor control routine under the non-loading condition.

The routines may be merged in the following manner. In the motor control routine under the non-loading condition shown in the flowchart of FIG. 6, the processing of step S100 is omitted, and the electric currents control process is added after the calculation of ω (step S120). The electric currents control process causes the electric currents corresponding to the required torque of the motor to flow through the windings when the required torque is not substantially equal to zero, while causing the electric current to flow through the d-axis when the required torque is substantially equal to zero. Repeatedly executing this control routine results in the same state as that realized by execution of step S100 in the flowchart of FIG. 6.

The motor control apparatus 10 of the embodiment can detect the electrical angle with a high accuracy and appropriately control the motor, even when the motor is driven under the non-loading condition. Addition of any special hardware structure is not required for that purpose. The motor control routine under the non-loading condition may be merged with the standard motor control routine at high-speed rotation. This facilitates the software arrangement.

Figure 9:
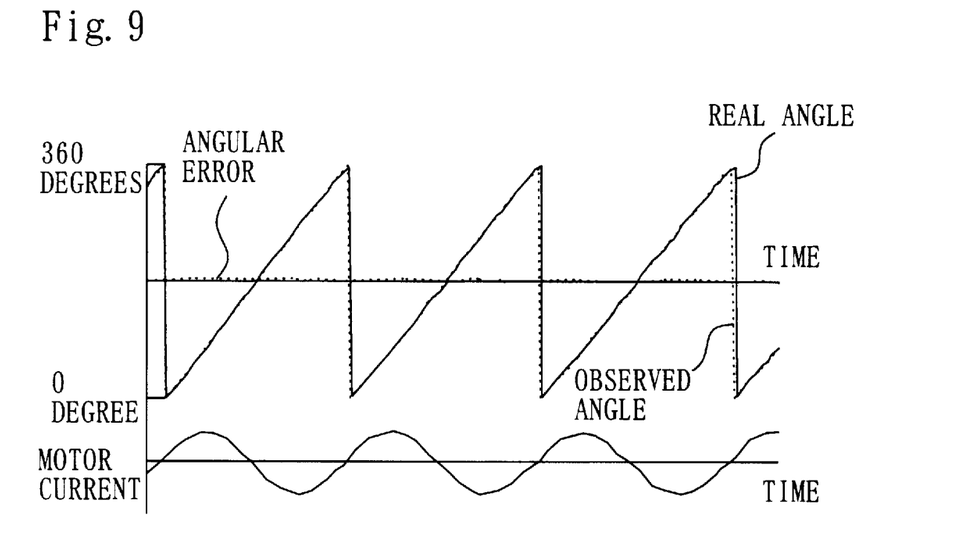
FIG. 9 is a graph showing the results of the electrical angle detection by the process of the embodiment.

FIGS. 8 and 9 show the results of the experiments regarding the above effects. FIG. 8 shows a comparison between the electrical angle detected by the conventional method of electrical angle detection (hereinafter referred to as the observed angle) and the electrical angle measured with a rotational angle sensor (hereinafter referred to as the real angle) in the motor that is driven under the non-loading condition. In the graph of FIG. 8, the electrical angle is plotted as ordinate and the time as abscissa. Substantially no electric current flows through the motor because of the non-loading rotation. As clearly understood from the graph of FIG. 8, there is a significant angular error between the observed angle and the real angle over the whole time.

FIG. 9 shows a comparison between the observed angle according to this embodiment and the real angle. This embodiment makes the electric current flow through the d-axis and accordingly realizes the flow of the motor current. A periodical variation in motor current is ascribed to a variation in U-phase electric current, which is the motor current, with a variation in electrical angle. The d-axis electric current after the phase conversion has substantially a constant value. As clearly understood from the graph of FIG. 9, the angular error between the observed angle and the real angle significantly decreases to a negligible level, compared with the graph of FIG. 8.

The embodiment applies the voltage to the d-axis at step S100 in the flowchart of FIG. 6. This is because application of the voltage to the d-axis hardly affects the torque. In principle, the voltage may alternatively be applied to the q-axis. In this case, it is desirable to apply a small voltage that keeps a torque variation in a practically allowable range. Another possible procedure applies the voltage to a specified phase, for example, the U phase, irrespective of the d-axis and the q-axis. Application of the voltage to the specified phase facilitates the processing of step S100 in the flowchart of FIG. 6. In this case, it is also desirable to apply a small voltage that keeps a torque variation in a practically allowable range.

(5) Application of Motor Control Apparatus

Figure 10:
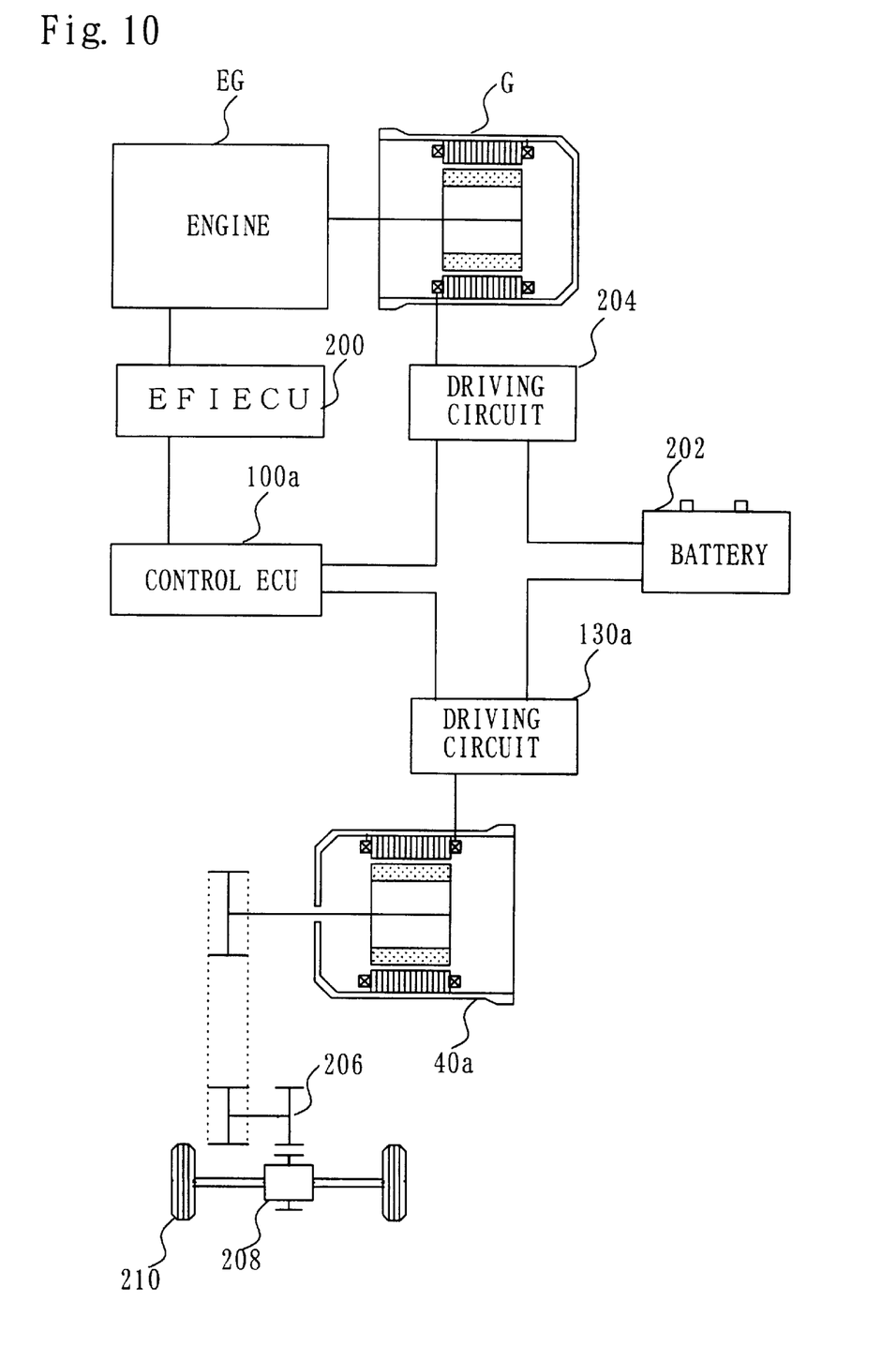
FIG. 10 schematically illustrates the structure of a hybrid vehicle, to which the motor control apparatus of the embodiment is applied.

In order to elucidate the effects of the motor control apparatus of the embodiment and the motor with the motor control apparatus, application of the motor control apparatus is described with the drawing of FIG. 10. FIG. 10 schematically illustrates the structure of a hybrid vehicle, to which the motor control apparatus of the embodiment is applied. Both an engine and a motor are mounted on the hybrid vehicle. In the hybrid vehicle shown in FIG. 10, the power of the engine is not directly transmitted to driving wheels as described below. This type of the hybrid vehicle is specifically referred to as a series-type hybrid vehicle.

Referring to FIG. 10, an engine EG is either a gasoline engine or a diesel engine generally used for the vehicle. A crankshaft of the engine EG is mechanically linked with a rotating shaft of a generator G, so that operation of the engine EG causes the generator G to generate electric power. The generated electric power is stored in a battery 202 via a driving circuit 204 that is connected with the generator G. The electric power stored in the battery 202 is supplied to a motor 40a via a driving circuit 130a, so as to rotate the motor 40a. The power output from the motor 40a is transmitted to driving wheels 210 via a power transmission gear 206 and a differential gear 208, so as to drive the vehicle.

The engine EG is connected to a control ECU 100a via an EFIECU 200, whereas the generator G and the motor 40a are connected to the control ECU 100a via the driving circuits 204 and 130a, respectively. The EFIECU 200 is a control unit that controls operation of the engine EG. The control ECU 100a outputs information required for controlling the engine EG to the EFIECU 200, and thereby indirectly controls the operation of the engine EG.

The control ECU 100a also regulates the switching operations of the driving circuits 204 and 130a and thereby controls the operations of the generator G and the motor 40a. These elements are mapped to the elements of the motor control apparatus 10 of the embodiment shown in FIG. 1. The control ECU 100a corresponds to the control ECU 100, the driving circuit 130a to the voltage application unit 130, and the motor 40a to the motor 40. The electric current sensors 102, 103, and 104, the filters 106, 107, and 108, and the ADCs 112, 113, and 114 are omitted from the illustration of FIG. 10.

In the hybrid vehicle thus constructed, the control ECU 100a controls the motor 40a according to the will of the driver input through, for example, operation of an accelerator and the driving conditions of the vehicle. By way of example, in the process of accelerating the vehicle from the ceased state, the motor 40a is required to be driven at a low-speed rotation and with a high torque. In the normal run, on the other hand, the motor 40a is required to be driven at a high-speed rotation and with a low torque.

The motor control procedure under the non-loading condition described in the above embodiment is applied, for example, when the hybrid vehicle goes down a slope. During the down-slope run, the rotation of the driving wheels 210 is transmitted to an output shaft of the motor 40a via the differential gear 208 and the power transmission gear 206. In the case where a braking force is applied to the vehicle through power generation by the motor 40a, the motor 40a is driven with a negative torque. In the case where the vehicle receives no braking force but naturally runs by taking advantage of the gravity, on the other hand, the motor 40a is driven under the non-loading condition.

The hybrid vehicle runs with the torque of the motor 40a after going down a slope. The driving state of the motor 40a is thus required to change smoothly from the non-loading condition to the loading condition. If the electrical angle of the motor 40a can not be detected under the non-loading condition, the shift of the driving state to the loading condition causes a torque variation. This remarkably lowers the riding quality of the hybrid vehicle. The motor control apparatus of the embodiment mounted on the hybrid vehicle, however, enables accurate detection of the electrical angle even when the motor 40a is driven under the non-loading condition, for example, when the vehicle goes down a slope. The shift of the driving state to the loading condition accordingly does not cause a torque variation but realizes output of a desired torque.

As described above, the motor control apparatus of the present invention is especially useful when the driving state of the motor is required to change smoothly from the non-loading condition to the loading condition. Although the example of application regards the hybrid vehicle, application of the motor control apparatus of the present invention is not restricted to this example.

The present invention is not restricted to the above embodiment or its modifications, but there may be many other modifications, changes, and alterations without departing from the scope or spirit of the main characteristics of the present invention.

It should be clearly understood that the above embodiment is only illustrative and not restrictive in any sense. The scope and spirit of the present invention are limited only by the terms of the appended claims.

What is claimed is:

1. In a synchronous motor that rotates a rotor through an interaction between a magnetic field occurring when multiphase alternating currents are flown through windings and a magnetic field produced by permanent magnets, said multiphase alternating current being generated by switching on and off a plurality of switching elements that are arranged in pairs for a plurality of phases and connected to a source and a drain of a power source, a motor control apparatus that controls operation of said synchronous motor by taking advantage of an electrical angle that defines position of said rotor, said motor control apparatus comprising:

a voltage application unit including said plurality of switching elements, said switching elements switch on and off with a delay of a dead time, based on an estimated electrical angle, so as to apply a predetermined voltage to said windings;

a controller that sends signals to said voltage application unit for providing the switching operation and applying a predetermined voltage corresponding to a torque command value, which is to be output by said synchronous motor, to said windings, said predetermined voltage includes the voltage which enables a significant electric current to flow through said windings, irrespective of magnitude of the voltage applied by said voltage application unit when the torque command value is substantially equal to zero; and an electrical angle correction unit that corrects the estimated electrical angle according to a predetermined arithmetic operation and specifies the corrected electrical angle as an estimated electrical angle at a next timing, said predetermined arithmetic operation using voltages corrected to eliminate an effect of the dead time, electric currents flowing through said windings in response to the voltages applied by said voltage application unit, and inductances specified according to characteristics of said synchronous motor.

2. A motor control apparatus in accordance with claim 1, wherein the predetermined voltage is applied in a d-axis direction by said voltage application unit, the d-axis direction passing through a center of rotation of said rotor and being along the magnetic field produced by said permanent magnets.

3. A motor control apparatus in accordance with claim 1, wherein said voltage application unit being a transister inverter.

4. In a synchronous motor that rotates a rotor through an interaction between a magnetic field occurring when multi-phase alternating currents are flown through windings and a magnetic field produced by permanent magnets, said multi-phase alternating current being generated by switching on and off a plurality of switching elements that are arranged in pairs for a plurality of phases and connected to a source and a drain of a power source, a method of controlling operation of said synchronous motor by taking advantage of an electrical angle that defines position of said rotor, said method comprising the steps of:

(a) switching on and off said plurality of switching elements with a delay of a dead time, based on an estimated electrical angle, so as to apply a voltage corresponding to a torque command value, which is to be output by said synchronous motor, to said windings;

(b) applying a predetermined voltage, which enables a significant electric current to flow through said windings, irrespective of magnitude of the voltage applied in said step (a) when the torque command value is substantially equal to zero; and (c) correcting the estimated electrical angle according to a predetermined arithmetic operation and specifying the corrected electrical angle as an estimated electrical angle at a next timing, said predetermined arithmetic operation using voltages corrected to eliminate an effect of the dead time, electric currents flowing through said windings in response to the voltages applied in said steps (a) and (b), and inductances specified according to characteristics of said synchronous motor.

* * * * *